US010193938B2

(12) United States Patent
Al-Damluji et al.

(10) Patent No.: US 10,193,938 B2
(45) Date of Patent: Jan. 29, 2019

(54) OPERATING A NETWORK NODE

(71) Applicant: Metaswitch Networks Ltd, Enfield (GB)

(72) Inventors: Salem Al-Damluji, Enfield (GB); Phillip James Springett, Enfield (GB)

(73) Assignee: Metaswitch Networks Ltd., Enfield (GB)

( * ) Notice: Subject to any disclaimer, the term of this patent is extended or adjusted under 35 U.S.C. 154(b) by 0 days.

(21) Appl. No.: 15/702,575

(22) Filed: Sep. 12, 2017

(65) Prior Publication Data

US 2018/0167423 A1 Jun. 14, 2018

(30) Foreign Application Priority Data

Dec. 8, 2016 (GB) .................................. 1620870.4

(51) Int. Cl.
*H04L 29/06* (2006.01)
*H04M 3/46* (2006.01)

(52) U.S. Cl.
CPC ........ *H04L 65/1096* (2013.01); *H04L 65/105* (2013.01); *H04L 65/1006* (2013.01); *H04L 65/1069* (2013.01); *H04M 3/465* (2013.01)

(58) Field of Classification Search
None
See application file for complete search history.

(56) References Cited

U.S. PATENT DOCUMENTS

2008/0240375 A1* 10/2008 Chen ................. H04L 29/06027
379/87
2008/0259909 A1* 10/2008 Runeson ............. H04L 65/1006
370/352
2008/0279119 A1* 11/2008 Stille .................... H04L 65/1069
370/261

(Continued)

OTHER PUBLICATIONS

Jesske R: "draft-jessk-straw-forking-correlation"; XP050778004 CI-142966 3GPP draft; Jul. 14 2014;3rd Generation Partnership Project (3GPP), Mobile Competence Centre; 650,route des Lucioles ; F-06921 Sophia-Antipolis Cedex; France; URL:http://www.3gpp.org/ftp/Meetings3GPPSYNC/CTI/Docs/.

(Continued)

*Primary Examiner* — Lonnie V Sweet
(74) *Attorney, Agent, or Firm* — EIP US LLP

(57) ABSTRACT

A network node, during setup of a communication session between a calling party and at least a called party, receives a first provisional response message from a first device comprising first session description protocol (SDP) data; and forwards it on to a calling party device associated with the calling party, the forwarded first provisional response message comprising at least a part of the first SDP data. The network node receives a second provisional response message comprising second SDP data from a second device. Responsive to receipt of the second provisional response message, the network node transmits, during communication session setup, a message to the calling party device which offers to update the SDP data; removes the second SDP data from the second provisional response message;

(Continued)

and transmits the second provisional response message from which the second SDP data has been removed to the calling party device.

17 Claims, 2 Drawing Sheets

(56) References Cited

U.S. PATENT DOCUMENTS

| | | | | |
|---|---|---|---|---|
| 2010/0165976 A1* | 7/2010 | Khan | ............... | H04M 3/42263 370/352 |
| 2012/0158862 A1* | 6/2012 | Mosko | ............... | H04L 65/1069 709/206 |
| 2013/0246632 A1* | 9/2013 | Ginde | ............... | H04L 65/1006 709/227 |
| 2013/0304930 A1* | 11/2013 | Belling | ............ | H04L 29/08576 709/228 |
| 2015/0120946 A1* | 4/2015 | Noldus | ............... | H04L 65/1096 709/228 |

OTHER PUBLICATIONS

Jesske Roland: "Correlation of multiple responses of forked INVITES in Back to Back User Agents", Mar. 3, 2015. https://tools.ietf.org/html/draft-jesske-dispatch-forking-answer-correlation-03.

Camarillo et al.: "Early Media and Ringing Tone Generation in the Session Initiation Protocol (SIP)", Dec. 2004, https://tools.ietf.org/html/rfc3960.

Rosenberg et al.: "Caller Preferences for the Session Initiation Protocol (SIP)", Aug. 2004, https://www.ietf.org/rfc/rfc3841.txt.

Rosenberg J.: "The Session Initiation Protocol (SIP) UPDATE Method", Sep. 2002, https://tools.ietf.org/html/rfc3311.

Rosenberg et al: "SIP: Session Initiation Protocol", Jun. 2002 https://tools.ietf.org/html/rfc3261.

Combined Search and Examination Report dated Jan. 18, 2017 on related Application No. GB1620870.4, filed Dec. 8, 2016.

Combined Search and Examination Report dated Feb. 15, 2017 on related Application No. GB1620870.4, filed Dec. 8, 2016.

Examination Report under Section 18(3) dated Mar. 28, 2017 on related Application No. GB1620870.4, filed Dec. 8, 2016.

* cited by examiner

OPERATING A NETWORK NODE

CROSS-REFERENCE TO RELATED APPLICATIONS

This application claims priority to United Kingdom Patent Application No. GB 1620870.4, filed on Dec. 8, 2016, the entire content of which is incorporated herein by reference.

BACKGROUND OF THE INVENTION

Field of the Invention

The present disclosure relates to operating a network node. In particular, but not exclusively, the present disclosure relates to operating a network node during setup of a communication session between a calling party and at least a called party.

Description of the Related Technology

In a typical Session Initiation Protocol (SIP) call (or communication session) setup, a calling party endpoint device sends a communication session setup request message such as a SIP INVITE message containing Session Description Protocol (SDP) data suggesting which media to use (for, example choice of codec). A called party device then typically responds with a provisional SIP 18x response message identifying in its SDP data the codec it will use, possibly along with other information (for example, that early media can be sent so that the calling party hears a ringing tone at their calling party device). The '18x' notation here indicates any type of SIP message where the x is replaced by a numeral, for example a 0 for a SIP 180 Ringing message, or a 3 for a SIP 183 Session progress message.

Additionally, a call may be "forked" where the same SIP INVITE message is passed to multiple devices to process simultaneously. For example, a called party called Bob may have two user devices (for example, telephones) and when a calling party called Alice rings Bob, the one call set up request is sent to both of Bob's user devices at (approximately) the same time, each of which may therefore send provisional 18x responses specifying early media to be played out to the calling party during setup of the call.

A session border controller (SBC) or other back-to-back user agent (B2BUA) in the signaling path may simplify the multiple dialogs set up with each of Bob's user devices into a single dialog presented to Alice. This can be desirable for multiple reasons such as compatibility with networks or endpoints that do not support, or do not wish to receive, multiple dialogs (some telephones do not support multiple dialogs, and callers are allowed to indicate this as per Internet Engineering Task Force (IETF) Request For Comments (RFC) 3841); bandwidth limitations (if each call is allowed to set up early media to the caller, this costs resource and presents a possible attack vector for malicious entities); and topology hiding.

SIP specifications state that once a calling party has received a reliable SDP answer on a 18x provisional response, no more SDP offers or answers may be sent on SIP INVITE responses in that dialog until the dialog is finalized (for example with a SIP 200 OK message). In the forked call case described above then, it is not clear which SDP answer should be sent on to the calling party.

Some existing SBCs forward to the caller the first 18x provisional response they receive together with the SDP it contains, and do not pass on any subsequent 18x provisional responses and the SDP they contain. The calling party will therefore hear media from the endpoint that responds fastest, but not any others. This can lead to potential problems such as the following:

If the two called party endpoints respond with different SDP, then only the first gets passed back to the calling party.

In some scenarios, the desired behavior is for the calling party to hear the early media from the second (or subsequent) endpoint.

A subsequent 18x provisional response may contain information about the call that it is important to pass through to the caller network, regardless of the SDP on it. Not passing on the rest of the message, just because it contains SDP, leads to a loss of this information.

If a B2BUA does wish to change the media stream to be from the second or subsequent called party, this would happen without alerting the calling party device to the stream change, or getting the permission of the calling party. However, if the new media stream is incompatible with the first answer received by the caller (for example, due to a codec change), the caller will not be able to receive the new early media stream.

Second and subsequent forks can be prevented from sending early media to the caller. This avoids the passing of a new, incompatible media stream to the calling party, but the first early media stream is locked in place and cannot be changed.

A new SDP answer can be passed to the caller, in violation of the SIP protocol, in the hope that the calling party device simply accepts this as a new SDP answer despite the protocol violation. However, this is unsatisfactory, because the calling party device is likely to reject the new answer as a protocol violation, and even if it does accept it, it is more likely to view it as a new offer, causing state incompatibility between the calling party device and the called party devices.

SUMMARY

According to embodiments, there is a method of operating a network node, the method comprising, at the network node, during setup of a communication session between a calling party and at least a called party: receiving a first provisional response message from a first device, the first provisional response message comprising first session description protocol (SDP) data; forwarding the first provisional response message on to a calling party device associated with the calling party, the forwarded first provisional response message comprising at least a part of the first SDP data; receiving a second provisional response message from a second device, the second provisional response message comprising second SDP data; in response to receipt of the second provisional response message, transmitting, during communication session setup, a message to the calling party device which offers to update the SDP data to at least a part of the second SDP data before a communication session is established; removing the second SDP data from the second provisional response message; and transmitting the second provisional response message from which the second SDP data has been removed to the calling party device.

According to embodiments, there is provided apparatus for use in operating a network node, the apparatus comprising: at least one processor; and at least one memory including computer program code; the at least one memory and the computer program code being configured to, with the at least one processor, cause the apparatus at least to, at the network node, during setup of a communication session between a calling party and at least a called party: receive a first provisional response message from a first device, the first provisional response message comprising first session description protocol (SDP) data; forward the first provisional response message on to a calling party device associated with the calling party, the forwarded first provisional response message comprising at least a part of the first SDP data; receive a second provisional response message from a second device, the second provisional response message comprising second SDP data; in response to receipt of the second provisional response message, transmit, during communication session setup, a message to the calling party device which offers to update the SDP data to at least a part of the second SDP data before a communication session is established; remove the second SDP data from the second provisional response message; and transmit the second provisional response message from which the second SDP data has been removed to the calling party device.

According to embodiments, there is a session border controller (SBC), the SBC being configured to, during setup of a communication session between a calling party and at least a called party: receive a first provisional response message from a first device, the first provisional response message comprising first session description protocol (SDP) data; forward the first provisional response message on to a calling party device associated with the calling party, the forwarded first provisional response message comprising at least a part of the first SDP data; receive a second provisional response message from a second device, the second provisional response message comprising second SDP data; in response to receipt of the second provisional response message, transmit, during communication session setup, a message to the calling party device which offers to update the SDP data to at least a part of the second SDP data before a communication session is established; remove the second SDP data from the second provisional response message; and transmit the second provisional response message from which the second SDP data has been removed to the calling party device.

According to embodiments, there is a non-transitory computer-readable storage medium comprising a set of computer-readable instructions stored thereon, which, when executed by a processing system, cause the processing system to perform a method of operating a network node, the method comprising, at the network node, during setup of a communication session between a calling party and at least a called party: receiving a first provisional response message from a first device, the first provisional response message comprising first session description protocol (SDP) data; forwarding the first provisional response message on to a calling party device associated with the calling party, the forwarded first provisional response message comprising at least a part of the first SDP data; receiving a second provisional response message from a second device, the second provisional response message comprising second SDP data; in response to receipt of the second provisional response message, transmitting, during communication session setup, a message to the calling party device which offers to update the SDP data to at least a part of the second SDP data before a communication session is established; removing the second SDP data from the second provisional response message; and transmitting the second provisional response message from which the second SDP data has been removed to the calling party device.

According to embodiments, there is provided a method of operating a back-to-back user agent (B2BUA), the method comprising, at the B2BUA, during setup of a communication session between a calling party and at least a called party: receiving a first provisional response message from a first device, the first provisional response message comprising first session description protocol (SDP) data; forwarding the first provisional response message on to a calling party device associated with the calling party, the forwarded first provisional response message comprising at least a part of the first SDP data; receiving a second provisional response message from a second device, the second provisional response message comprising second SDP data; and in response to receipt of the second provisional response message, determining whether to perform reconfiguration of current SDP settings between the calling party device and the B2BUA.

According to embodiments, there is provided apparatus for use in operating a back-to-back user agent (B2BUA), the apparatus being configured to, at the B2BUA, during setup of a communication session between a calling party and at least a called party: receive a first provisional response message from a first device, the first provisional response message comprising first session description protocol (SDP) data; forward the first provisional response message on to a calling party device associated with the calling party, the forwarded first provisional response message comprising at least a part of the first SDP data; receive a second provisional response message from a second device, the second provisional response message comprising second SDP data; and in response to receipt of the second provisional response message, determine whether to perform reconfiguration of current SDP settings between the calling party device and the B2BUA.

According to embodiments, there is provided a computer program comprising a set of instructions, which, when executed by a computerized device, cause the computerized device to perform a method of operating a back-to-back user agent (B2BUA, the method comprising, at the B2BUA, during setup of a communication session between a calling party and at least a called party: receiving a first provisional response message from a first device, the first provisional response message comprising first session description protocol (SDP) data; forwarding the first provisional response message on to a calling party device associated with the calling party, the forwarded first provisional response message comprising at least a part of the first SDP data; receiving a second provisional response message from a second device, the second provisional response message comprising second SDP data; and in response to receipt of the second provisional response message, determining whether to perform reconfiguration of current SDP settings between the calling party device and the B2BUA.

According to embodiments, there is provided a method of operating a network node, the method comprising, at the network node, during setup of a communication session between a calling party and at least a called party: receiving a first provisional response message from a first device, the first provisional response message comprising first session description protocol (SDP) data; forwarding the first provisional response message on to a calling party device associated with the calling party, the forwarded first provisional response message comprising at least a part of the first SDP data; receiving a second provisional response message from a second device, the second provisional response message comprising second SDP data; and in response to receipt of the second provisional response message, removing the second SDP data from the second provisional response message and transmitting the second provisional response message from which the second SDP data has been removed to the calling party device.

Other embodiments may comprise non-transitory computer-readable storage mediums comprising computer-executable instructions which, when executed by a processor, cause a computing device to perform any of the method aspects.

Further features and advantages of the disclosure will become apparent from the following description of preferred embodiments of the disclosure, given by way of example only, which is made with reference to the accompanying drawings.

DETAILED DESCRIPTION OF CERTAIN INVENTIVE EMBODIMENTS

Figure 1:
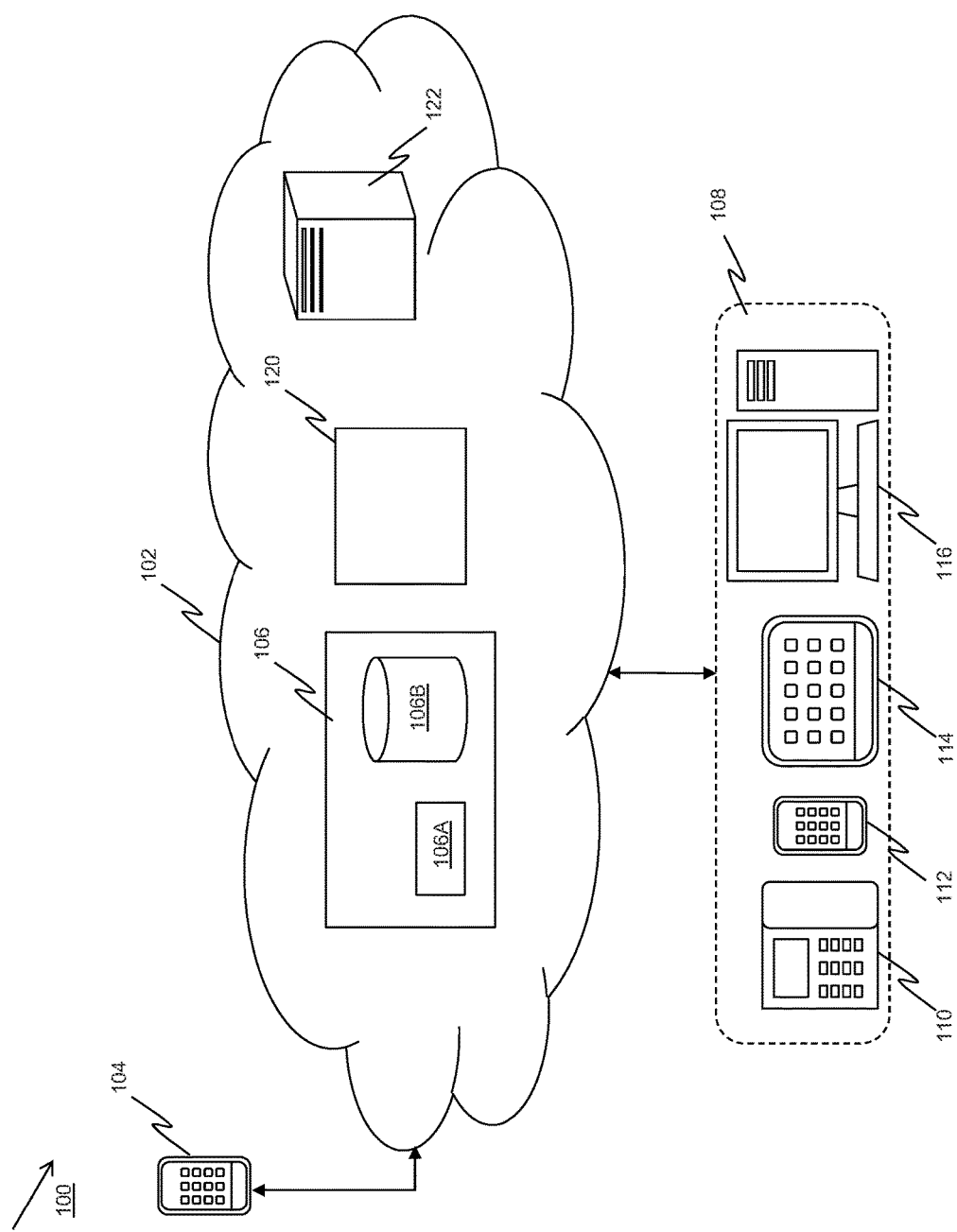
FIG. 1 shows a system diagram according to embodiments.

FIG. 1 shows a system diagram of a system 100 according to embodiments. System 100 comprises a network node 106, a forking proxy 120 and a further network node 122. Network node 106, forking proxy 120 and further network node 122 are depicted in FIG. 1 as being located in a network 102 which may comprise one or more wireless, wired, packet-switched and/or a circuit-switched networks, for example an Internet Protocol (IP) network such as the internet, an IP Multimedia Subsystem (IMS) network, a 3GPP network, etc. One or more of network node 106, forking proxy 120 and further network node 122 may be located in a different network or part of the network (not shown). Network 100 also comprises a calling party device 104 and one or more called party devices 108.

Network node 106 comprises one or more processors 106A for performing various data processing operations according to embodiments. Network node 106 comprises or otherwise has access to a database 106B for storing various data according to embodiments. Database 106B may comprise one or more memories and may be integral to or external to network node 106. Database 106B may comprise memory within network node 106 which is available for storing state data for communication sessions processed by network node 106; the memory may be volatile so that data stored therein may need to be re-learnt upon failure/re-boot of network node 106.

Network node 106 may comprise one or more of an SBC, a media gateway, a softswitch, a proxy call session control function (a P-CSCF from an IMS network), and a server. Network node 106 is able to communicate with other network elements in network 100 such as forking proxy 120, further network node 122, one or more other network elements (not shown), calling party device 104, and called party device(s) 108 via one or more wired or wireless network connections (not shown). Network node 106 may for example be logically located on the border between two networks (not shown).

Forking proxy 120 is responsible for providing communication session forking services in network 102. For example, forking proxy 120 may receive a single communication session setup request message from network node 106 and generate and transmit multiple communication session setup request messages to multiple other devices such as called party device(s) 108 and/or further network node 122. Forking proxy 120 may also fork other types of messages than communication session setup request messages.

Further network node 122 may provide services in relation to communication sessions currently being setup or communication sessions that have been established between endpoint devices such as calling party device 104 and called party device(s) 108. Further network node may provide media playback services, for example providing early media playback services during setup of communication sessions between calling party device 104 and called party device(s) 108.

Calling party device 104 is depicted in FIG. 1 as a mobile (or 'cellular') telephone, but may comprise any other user (endpoint) device, for example a SIP telephone, a tablet, a personal computer, etc. Calling party device 104 may comprise one or more processors (not shown) for performing various data processing operations according to embodiments and/or one or more memories (not shown) for storing various data according to embodiments.

Called party device 108 is depicted in FIG. 1 as a plurality of user (endpoint) devices such as SIP telephone 110, mobile (or 'cellular') telephone 112, tablet 114, personal computer 116. Alternatively, called party device 108 may comprise a single user device. Called party device 108 may comprise one or more processors (not shown) for performing various data processing operations according to embodiments and/or one or more memories (not shown) for storing various data according to embodiments.

Embodiments provide measures, including methods, apparatus, computer programs and computer program products, for use in operating a network node 106.

Figure 2:
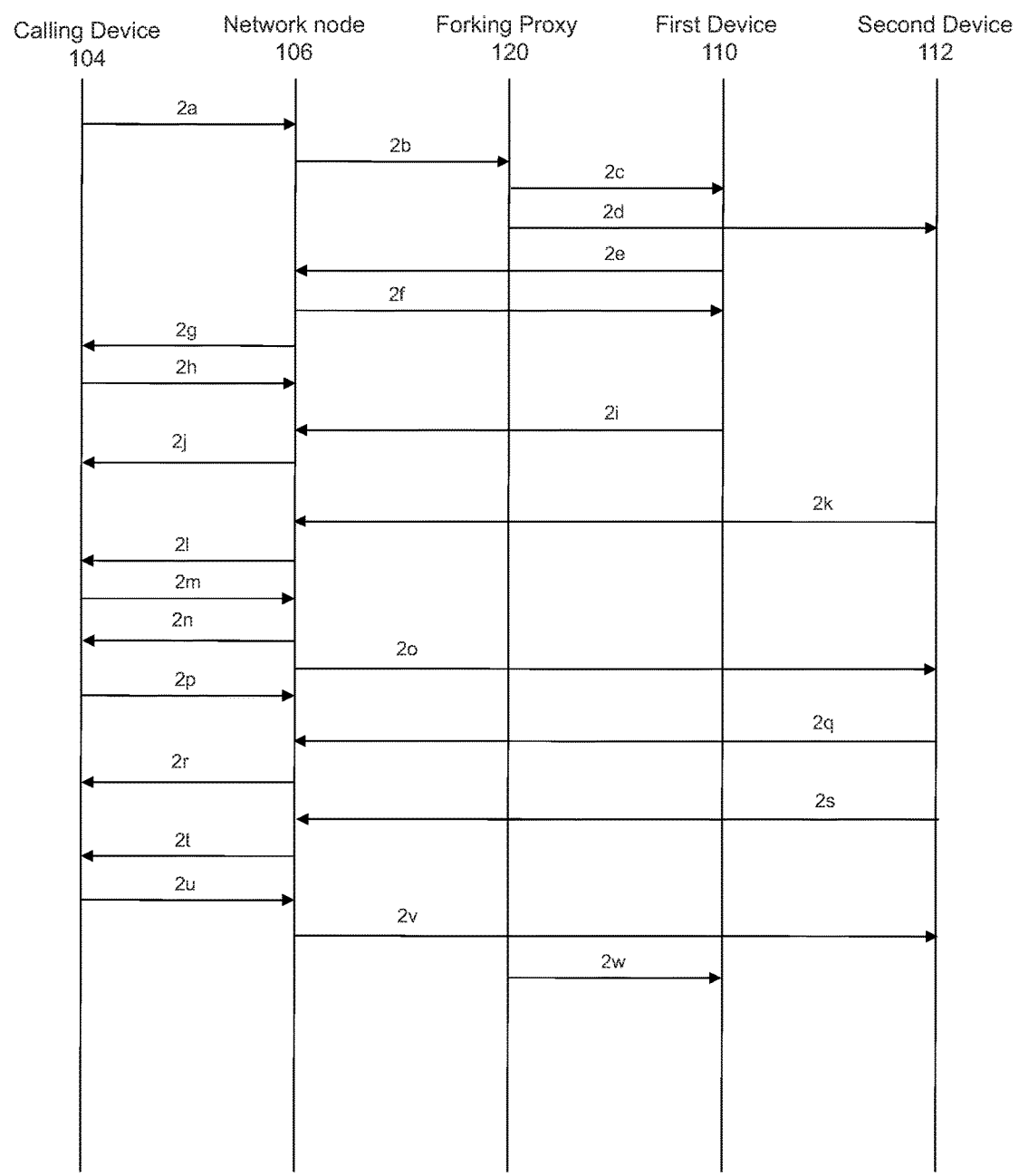
FIG. 2 shows a message flow diagram according to embodiments.

Embodiments of the present invention are now described in relation to FIG. 2. FIG. 2 shows a message flow diagram depicting message flow during setup of a communication session between a calling party and at least a called party according to embodiments. In embodiments, network node 106 acts as a B2BUA in relation to setup of a communication session between the calling party and the at least called party.

A user of calling party device 104 initiates setup of a communication session with a called party by inputting appropriate user input (for example an identifier for the called party such as their telephone number, their name, or their SIP ID) on a user interface of calling party device 104. Calling party device 104 proceeds to transmit a communication session setup request message in the form of a SIP INVITE message to network node 106 as per item 2a. The SIP INVITE message of item 2a comprises an offer of SDP data which the calling party device suggests for the communication session. The SIP INVITE message of item 2a may arrive at network node 106 via one or more proxy network elements (not shown).

Upon receipt of the SIP INVITE message of item 2a, network node 106 forwards the SIP INVITE message to forking proxy 120 which is responsible for providing communication session forking services in relation to at least the called party in network 102. Forking proxy 120 then generates and transmits two separate SIP INVITE messages and transmits these to first device 110 and second device 112 as per items 2c and 2d respectively.

Forking proxy may store data for users such as the called party indicating a plurality of devices associated with each user as well as associated identifiers and/or network addresses for contacting each of the users' devices during forking operations. One or more of first device 110 and second device 112 may comprise one or more of any of called party devices 108 and/or further network device 122.

In some embodiments, first and second devices 110 and 112 comprise user devices 108 associated with the called party.

In some embodiments, at least one of first device 110 and second device 112 comprises further network node 122. In some such embodiments, further network node 122 comprises a media playback services node responsible for providing media playback services in relation to at least the called party. The media playback services node may for example be responsible for providing early media playback services in relation to the called party during setup of communication sessions involving the called party. In such embodiments, the called party may subscribe to an early media playback service such that early media is played back to calling parties by the media playback services node on the called party's behalf. The playback of early media data may be configurable by the called party, for example allowing the called party to choose what media content is played back to which calling parties and under what circumstances, etc.

In alternative embodiments, forking operations are performed by network node 106 instead of or in addition to forking proxy 120.

In response to receipt of the SIP INVITE message of item 2c, first device 110 generates a first provisional response message comprising first SDP data and transmits this to network node 106 as per item 2e. In embodiments, the first SDP data comprises an answer to the SDP offered by called party device 104 in item 2a. In embodiments, the first provisional response message of item 2e comprises a SIP 18x provisional response message specifying early media, for example a SIP 183 Session Progress message.

In embodiments, the first provisional response message of item 2e is received from first device 110 in response to the forwarding of the received communication session setup request message to forking proxy 120 in item 2b.

Upon receipt of the first provisional response message from first device 110, network node 106 responds to first device 110 with a provisional acknowledgement message such as a SIP PRACK message as per item 2f.

Network node 106 forwards the first provisional response message on to calling party device 104 associated with the calling party as per item 2g. The forwarded first provisional response message comprises at least a part of the first SDP data.

Upon receipt of the first provisional response message from network node 106, calling party device 104 responds to network node 106 with a provisional acknowledgement message such as a SIP PRACK message as per item 2h.

First device 110 transmits a SIP 200 OK (PRACK) message to network node 106 in item 2i which is forwarded on to calling party device 104 in item 2j.

Early media data (i.e. media data sent during setup of the communication session before the communication session is established) is now able to flow between first device 110 and calling party device 104.

In response to receipt of the SIP INVITE message of item 2d, second device 112 generates a second provisional response message comprising second SDP data and transmits this to network node 106 as per item 2k. In embodiments, the second SDP data comprises an answer to the SDP offered by called party device 104 in item 2a. In embodiments, the first provisional response message of item 2k comprises a SIP 18x provisional response message specifying early media, for example a SIP 180 Ringing message.

In these embodiments, the second provisional response message of item 2k is transmitted later than transmittal of the first provisional response message of item 2e.

In embodiments, the second provisional response message of item 2k is received from second device 111 in response to the forwarding of the received communication session setup request message to forking proxy 120 in item 2b.

In response to receipt of the second provisional response message from second device 112, network node 106 transmits a message to calling party device 104 which offers to update the SDP data to at least a part of the second SDP data as per item 2l. In some embodiments, the message of item 2l transmitted to calling party device 104 which offers to update the SDP data to at least a part of the second SDP data comprises a SIP UPDATE message.

In item 2m, network node 106 receives a message from calling party device 104 which accepts the offer to update the SDP data to the at least part of the second SDP data. In some embodiments, the message received from calling party device 104 of item 2m which accepts the offer to update the SDP to at least a part of the second SDP data comprises a SIP 200 OK (UPDATE) message.

Network node 106 then removes the second SDP data from the second provisional response message and transmits the second provisional response message from which the second SDP data has been removed to calling party device 104 as per item 2n.

Network node 106 responds to the second provisional response message from second device 112 with a provisional acknowledgement message such as a SIP PRACK message as per item 2o.

Upon receipt of the second provisional response message from network node 106, calling party device 104 responds to network node 106 with a provisional acknowledgement message such as a SIP PRACK message as per item 2p.

Second device 112 transmits a SIP 200 OK (PRACK) message to network node 106 in item 2q which is forwarded on to calling party device 104 in item 2r.

Early media data is now able to flow between second device 112 and calling party device 104.

In some embodiments, network node 106 is configured up to fork a call to both the intended called party and (after a short period of time) a media server that plays an automated response until the called party picks up. Playing of the automated response may involve a codec not specified in the first SDP provisional response, but by use of embodiments the SDP data can be updated to support interoperability with the not initially supported coded.

In the embodiments of FIG. 2, a user (or automated agent) of second device 112 answers the call (i.e. the request for setup of a communication session is accepted) and second device 112 thus transmits an accept message such as a SIP 200 OK (INVITE) message to network device 106 as per item 2s. Network device 106 forwards the accept message on to calling party device as per item 2t. Calling party device acknowledges receipt of the accept message by transmitting an acknowledgement message such as a SIP ACK message to network node 106 in item 2u. Network device 106 forwards the acknowledgment message on to second device 112 as per item 2v. A communication session has now been established between calling party device 104 and second device 112 and media content such as voice data can now flow between calling party device 104 and second device 112.

One or more of network node 106, calling party device 104 and second device 112 notify (not shown) forking proxy 120 of the establishment of the communication session calling party device 104 and second device 112 and forking proxy 120 cancels the communication setup leg to first device 110 in item 2w.

In embodiments, one or more of the received first provisional response message of item 2e, the forwarded first provisional response message of item 2g, the received second provisional response message of item 2k, and the transmitted second provisional response message of item 2n comprise a SIP 18x provisional response message; the SIP 18x provisional response message may specify early media. In embodiments, the SIP 18x provisional response message comprises one or more of a SIP 183 Session Progress message and a SIP 180 Ringing message.

Some embodiments employ a provisional response sending reliability mechanism. According to embodiments, the forwarded first provisional response message of item 2g comprises provisional response sending reliability data. In such embodiments, in response to forwarding of the first provisional response message comprising the provisional response sending reliability data in item 2g, network node 106 receives a response message in item 2h transmitted by calling party device 104 confirming receipt and acceptance of the forwarded first provisional response message comprising the at least part of the first SDP data and the provisional response sending reliability data. In embodiments, the provisional response sending reliability data comprises data associated with the SIP 100rel extension and the response message of item 2h from calling party device 104 confirming receipt and acceptance of the forwarded first provisional response message of item 2g comprises a SIP Provisional Acknowledgement (PRACK) message.

Such embodiments employing a provisional response sending reliability mechanism such as the SIP 100rel extension serve to give called party device 104 advance warning that a message (for example a SIP UDPATE message) may subsequently be sent to calling party device 104 which offers to update the SDP data (for example to at least a part of the second SDP data). Calling party device 104 accepts support for such functionality by transmitting the response message of item 2h back to network node 106. Upon receipt of the response message of item 2h, network node 106 knows that calling party device 104 will be capable of correctly processing the message of item 2l which network node 104 subsequently transmits to calling party device 104 which offers to update the SDP data to at least a part of the second SDP data.

In embodiments, the received second provisional response message of item 2k comprises information associated with setup of the communication session with second device 112; in such embodiments, the information associated with setup of the communication session with second device 112 is comprised in the second provisional response message transmitted to calling party device 104 by network node 106 in item 2n. In embodiments, network node 106 inhibits removal of the information associated with setup of the communication session with second device 112 from the second provisional response message when the second SDP data is removed from the second provisional response message by network node 106. The information is therefore available at calling party device 104 for use in relation to setup of the communication session between calling party device 104 and second device 112. The information associated with setup of the communication session with second device 112 may for example comprise one or more of SIP 180 Ringing method information and SIP Private Header (P-Early-Media) header information.

Embodiments provide measures, including methods, apparatus, computer programs and computer program products, for use in operating a B2BUA. The B2BUA may for example comprise network node 106.

During setup of a communication session between a calling party and at least a called party, the B2BUA receives a first provisional response message from a first device. The first provisional response message comprises first SDP data. The B2BUA forwards the first provisional response message on to a calling party device associated with the calling party. The forwarded first provisional response message comprises at least a part of the first SDP data. The B2BUA receives a second provisional response message from a second device. The second provisional response message comprises second SDP data. In response to receipt of the second provisional response message, the B2BUA determines whether to perform reconfiguration of current SDP settings between the calling party device and the B2BUA.

In some embodiments, the determination is performed by the B2BUA at least in part on the basis of one or more predetermined SDP configuration settings associated with the called party. The one or more predetermined SDP configuration settings associated with the called party may for example be configurable by the called party.

In some embodiments, the determination is performed by the B2BUA at least in part on the basis of one or more predetermined SDP configuration settings associated with a network operator responsible for operating the B2BUA.

In some embodiments, the determination is performed by the B2BUA at least in part on the basis of one or more predetermined SDP configuration settings associated with a service provider responsible for providing communication services via the B2BUA.

In some embodiments, the determination is performed by the B2BUA at least in part on the basis of a default SDP configuration setting of the B2BUA.

In some embodiments, the determination is performed by the B2BUA at least in part on the basis of a priority of one of the first device and the second device over the other of the first device and the second device. For example the second device may comprise a media playback services network node which provides media playback services on behalf of the called party and the prioritization can act to enable the media playback services network node to play back appropriate early media to the called party whilst one or more other of the called party's devices are ringing. The priority (and/or other device/flow priorities) may be configurable by the called party.

In response to a positive determination (i.e. the B2BUA determines that reconfiguration of one or more SDP settings between the calling party device and the B2BUA is to be carried out), the B2BUA reconfigures current SDP settings between the calling party device and the B2BUA on the basis of at least a part of the second SDP data. Reconfiguring of the current SDP settings may comprise transmitting a message to the calling party device which offers to update the SDP data on the basis of the at least part of the second SDP data. Reconfiguring of the current SDP settings may comprise receiving a message from the calling party device which accepts the offer to update the SDP data on the basis of the at least part of the second SDP data. Reconfiguring of the current SDP settings may comprise removing the second SDP data from the second provisional response message and transmitting the second provisional response message from which the second SDP data has been removed to the calling party device.

According to some embodiments where the B2BUA makes a positive determination, the B2BUA receives, from the second device, early media data configured according to the at least part of the second SDP data, and forwards the received early media data configured according to the at least part of the second SDP data on to the calling party device.

In response to a negative determination by the B2BUA (i.e. the B2BUA determines that reconfiguration of SDP settings between the calling party device and the B2BUA is not to be carried out), the B2BUA maintains the current SDP settings between the calling party device and the B2BUA on the basis of the at least part of the first SDP data.

According to some embodiments where the B2BUA makes a negative determination, the B2BUA receives, from the first device, early media data configured according to the at least part of the first SDP data, and forwards the received early media data configured according to the at least part of the first SDP data on to the calling party device.

Embodiments therefore allow selection of whether SDP data and/or one or more SDP settings from a first provisional response remains (a negative determination), or whether one or more subsequent provisional responses lead to the SDP data and/or one or more SDP settings being overwritten (a positive determination).

Embodiments allow early media to flow from endpoints that do not respond first in forked-call scenarios. In some embodiments, a first 18x provisional response received by network node 106 (which may be operating as a B2BUA for the call/communication session) is passed back to the caller along with some or all of its SDP data. In some embodiments, subsequent 18x provisional responses are split into two messages that are sent back to the calling party; a first such message may for example comprise a new UPDATE message containing some or all of the SDP data from the subsequent 18x provisional response, and a second such message, if that UPDATE is successful, comprising the subsequent 18x provisional response stripped of its SDP data. Such embodiments enable the calling party to have the SDP data contained on the latest fork to give a provisional response, and to receive all 18x messages on the call.

Other embodiments involve manipulation of what is contained in the UPDATE SDP generated and transmitted back to the calling party device by network node 106. For example, values in the first provisional response can be kept for some SDP fields, but values in subsequent provisional responses can be used for other SDP fields.

As one example such embodiment, security settings to calling party device 104 can be maintained for example if SDP data in the first provisional response specifies using Secure Real-time Transport Protocol (SRTP), but subsequent responses specify RTP, then only the portion of the call between network device 106 and the second responding device uses RTP. In embodiments, SDP data on the UPDATE message transmitted by network node 106 is configured by network device 106 to ensure the portion of the call from calling party device 104 to network device 106 remains as SRTP.

As another example such embodiment, one or more codec settings to calling party device 104 can be maintained for example if SDP data in the first provisional response specifies using an initial codec and then a subsequent provisional response specifies a different codec (which may not be supported or which may not be preferred by the calling party device). By use of embodiments, the portion of the call between network device 106 and the subsequent responding device is configured to use the different codec, whereas the portion of the call between network device 106 and the calling party device remains configured to use the initial codec. In embodiments, SDP data on the UPDATE message transmitted by network node 106 is configured by network device 106 to ensure the initial codec continues to be used for the portion of the call between calling party device 104 and network device 106. In such embodiments, network device 106 may carry out some manipulation of media data received from the calling party device 104 and/or the subsequent responding device in order to ensure that the correct codec format is used on either side (i.e. looking towards the calling party device and looking towards the subsequent responding device) of the network device 106.

By use of embodiments, calling party device 104 receives all notifications present on multiple 18x messages generated during communication session setup. Embodiments allow the media stream to calling party device 104 to be changed during communication session setup. By use of embodiments, media content such as early media content is not dropped during communication session setup.

Embodiments define appropriate behavior for a network node located between a calling party device and one or more called party devices. Embodiments provide a mechanism for a network node to change the calling party's early media. Embodiments prevent presentation of a mosaic of early media from different endpoints to the calling party device; this assists in preventing possibly erroneous behavior of the calling party device when confronted with unexpected multiple dialogs and/or media streams as well as avoiding increased bandwidth use by such.

Embodiments involve operating a network node during setup of a communication session between a calling party and at least a called party. A first provisional response message is received from a first device. The first provisional response message comprises first SDP data. The first provisional response message is forwarded on to a calling party device associated with the calling party. The forwarded first provisional response message comprises at least a part of the first SDP data. A second provisional response message is received from a second device. The second provisional response message comprises second SDP data. In response to receipt of the second provisional response message, the second SDP data is removed from the second provisional response message, and the second provisional response message from which the second SDP data has been removed is transmitted to the calling party device.

In embodiments, network node 106 comprises a processor or processing system, as depicted by element 106A in FIG. 1. In embodiments, the processing system comprises one or more processors and/or memory 106B. Each device as described in relation to any of the embodiments described above may similarly comprise a processor and/or processing system. One or more of the aspects of the embodiments described herein with reference to the drawings comprise processes performed by network node 106. In embodiments, network node 106 comprises one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device; etc.

The above embodiments are to be understood as illustrative examples of the disclosure. Further embodiments of the disclosure are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

What is claimed is:

1. A method of operating a network node, the method comprising, at the network node, during setup of a communication session between a calling party and at least a called party:
    receiving a communication session setup request message from a calling party device associated with the calling party;
    forwarding the received communication session setup request message to a forking proxy responsible for providing communication session forking services in relation to at least the called party;
    receiving a first provisional response message from a first device, the first provisional response message comprising first session description protocol (SDP) data, wherein the first provisional response message is received from the first device in response to the forwarding of the received communication session setup request message to the forking proxy;
    forwarding the first provisional response message on to the calling party device, the forwarded first provisional response message comprising at least a part of the first SDP data;
    receiving a first provisional acknowledgement message from the calling party device and receiving a second provisional acknowledgement message from the first device, thereby enabling media data sent during setup of the communication session before the communication session is established to flow between the first device and the calling party device;
    receiving a second provisional response message from a second device, the second provisional response message comprising second SDP data, wherein the second provisional response message is received from the second device in response to the forwarding of the received communication session setup request message to the forking proxy;
    receiving an answer message which accepts the communication session setup request received in the communication session setup request message from the calling party device; and
    forwarding the answer message to the calling party device, wherein the method further comprises:
        in response to receipt of the second provisional response message, transmitting, during setup of the communication session, a first message to the calling party device, which offers to update the SDP data to at least a part of the second SDP data, before the answer message is transmitted to the calling party device;
        receiving a second message from the calling party device which accepts the offer to update the SDP data to the at least part of the second SDP data;
        responsive to receipt of the second message, removing the second SDP data from the second provisional response message, and
        transmitting the second provisional response message from which the second SDP data has been removed to the calling party device; and
        receiving a third provisional acknowledgement message from the calling party device and receiving a fourth provisional acknowledgement message from the second device, thereby enabling media data sent during setup of the communication session before the communication session is established to flow between the second device and the calling party device.

2. The method of claim 1, wherein the first and second devices comprise user devices associated with the called party.

3. The method of claim 1, wherein at least one of the first and second devices comprises a further network node.

4. The method of claim 3, wherein the further network node comprises a media playback services node responsible for providing media playback services in relation to at least the called party.

5. The method of claim 4, wherein the media playback services node is responsible for providing early media playback services in relation to the called party during setup of communication sessions involving the called party.

6. The method of claim 1, wherein the forwarded first provisional response message comprises provisional response sending reliability data, the method comprising:
    in response to forwarding of the first provisional response message comprising the provisional response sending reliability data, receiving a response message from the calling party device confirming receipt and acceptance of the forwarded first provisional response message comprising the at least part of the first SDP data and the provisional response sending reliability data.

7. The method of claim 6, wherein the provisional response sending reliability data comprises data associated with the Session Initiation Protocol (SIP) 100rel extension and the response message from the calling party device confirming receipt and acceptance of the forwarded first provisional response message comprises a SIP Provisional Acknowledgement (PRACK) message.

8. The method of claim 1, wherein the message received from the calling party device which accepts the offer to update the SDP to at least a part of the second SDP data comprises a SIP 200 OK (UPDATE) message.

9. The method of claim 1, wherein one or more of the received first provisional response message, the forwarded first provisional response message, the received second provisional response message, and the transmitted second provisional response message comprise a SIP 18x provisional response message specifying early media.

10. The method of claim 9, wherein the SIP 18x provisional response message comprises one or more of:
    a SIP 183 Session Progress message, and
    a SIP 180 Ringing message.

11. The method of claim 1, wherein the received second provisional response message comprises information associated with setup of the communication session with the second device,
    wherein the information associated with setup of the communication session with the second device is comprised in the second provisional response message transmitted to the calling party device.

12. The method of claim 11, comprising inhibiting removal of the information associated with setup of the communication session with the second device from the second provisional response message when the second SDP data is removed from the second provisional response message.

13. The method of claim 11, wherein the information associated with setup of the communication session with the second device comprises one or more of SIP 180 Ringing method information and SIP Private Header (P-Early-Media) header information.

14. The method of claim 1, wherein one or more of the communication session setup request message received from the calling party device and the communication session setup request message forwarded to the forking proxy comprise SIP INVITE messages.

15. The method of claim 1, wherein the network node acts as a back-to-back user agent (B2BUA) in relation to setup of the communication session between the calling party and the at least called party.

16. Apparatus for use in operating a network node, the apparatus comprising:
   at least one processor;
   and at least one memory including computer program code;
   the at least one memory and the computer program code being configured to, with the at least one processor, cause the apparatus at least to, at the network node, during setup of a communication session between a calling party and at least a called party:
      receive a communication session setup request message from a calling party device associated with the calling party;
      forward the received communication session setup request message to a forking proxy responsible for providing communication session forking services in relation to at least the called party;
      receive a first provisional response message from a first device, the first provisional response message comprising first session description protocol (SDP) data, wherein the first provisional response message is received from the first device in response to the forwarding of the received communication session setup request message to the forking proxy;
      forward the first provisional response message on to the calling party device, the forwarded first provisional response message comprising at least a part of the first SDP data;
      receive a first provisional acknowledgement message from the calling party device and receive a second provisional acknowledgement message from the first device, thereby enabling media data sent during setup of the communication session before the communication session is established to flow between the first device and the calling party device;
      receive a second provisional response message from a second device, the second provisional response message comprising second SDP data;
      receive an answer message which accepts the communication session setup request received in the communication session setup request message from the calling party device; and
      forward the answer message to the calling party device,
      wherein, in response to receipt of the second provisional response message:
         transmit, during setup of the communication session, a first message to the calling party device which offers to update the SDP data to at least a part of the second SDP data before the answer message is transmitted to the calling party device;
         responsive to receipt of the second message, remove the second SDP data from the second provisional response message;
         transmit the second provisional response message from which the second SDP data has been removed to the calling party device; and
         receive a third provisional acknowledgement message from the calling party device and receive a fourth provisional acknowledgement message from the second device, thereby enabling media data sent during setup of the communication session before the communication session is established to flow between the second device and the calling party device.

17. A non-transitory computer-readable storage medium comprising a set of computer-readable instructions stored thereon, which, when executed by a processing system, cause the processing system to perform a method of operating a network node, the method comprising, at the network node, during setup of a communication session between a calling party and at least a called party:
   receiving a communication session setup request message from a calling party device associated with the calling party;
   forwarding the received communication session setup request message to a forking proxy responsible for providing communication session forking services in relation to at least the called party;
   receiving a first provisional response message from a first device, the first provisional response message comprising first session description protocol (SDP) data, wherein the first provisional response message is received from the first device in response to the forwarding of the received communication session setup request message to the forking proxy;
   forwarding the first provisional response message on to the calling party device, the forwarded first provisional response message comprising at least a part of the first SDP data;
   receiving a first provisional acknowledgement message from the calling party device and receiving a second provisional acknowledgement message from the first device, thereby enabling media data sent during setup of the communication session before the communication session is established to flow between the first device and the calling party device;
   receiving a second provisional response message from a second device, the second provisional response message comprising second SDP data, wherein the second provisional response message is received from the second device in response to the forwarding of the received communication session setup request message to the forking proxy;
   receiving an answer message which accepts the communication session setup request received in the communication session setup request message from the calling party device; and
   forwarding the answer message to the calling party device,
   wherein, in response to receipt of the second provisional response message:
      transmitting, during setup of the communication session, a first message to the calling party device which offers to update the SDP data to at least a part of the second SDP data before the answer message is transmitted to the calling party device;

receiving a second message from the calling party device which accepts the offer to update the SDP data to the at least part of the second SDP data;

responsive to receipt of the second message, removing the second SDP data from the second provisional response message;

transmitting the second provisional response message from which the second SDP data has been removed to the calling party device; and receiving a third provisional acknowledgement message from the calling party device and receiving a fourth provisional acknowledgement message from the second device, thereby enabling media data sent during setup of the communication session before the communication session is established to flow between the second device and the calling party device.

* * * * *